Jan. 20, 1942.   H. C. OSBORN, JR   2,270,469
PRESSURE RELIEF VALVE
Filed April 10, 1941
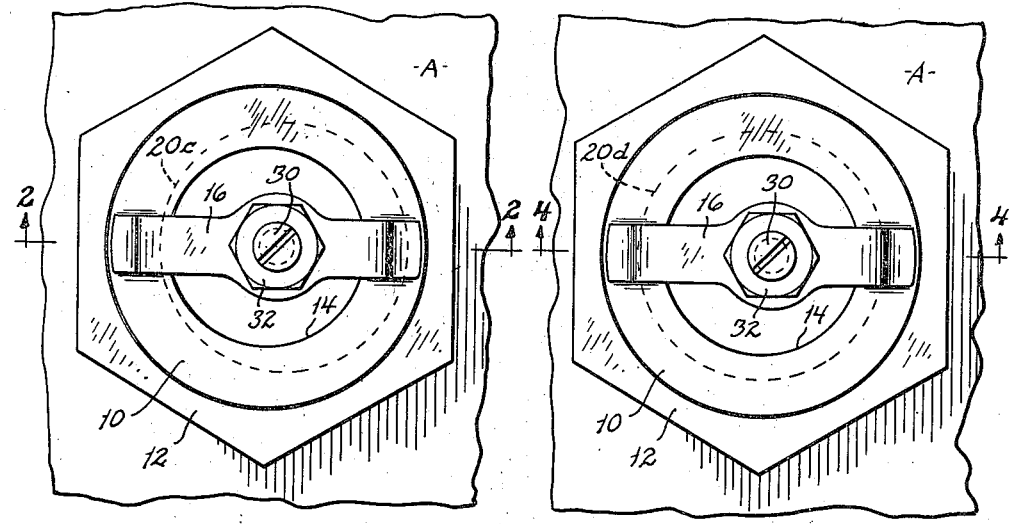
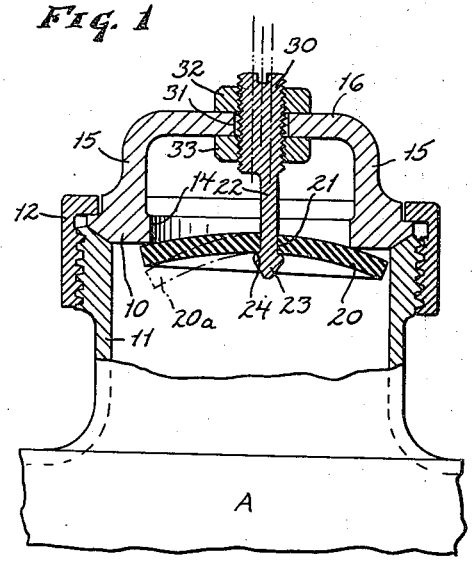
Fig. 2
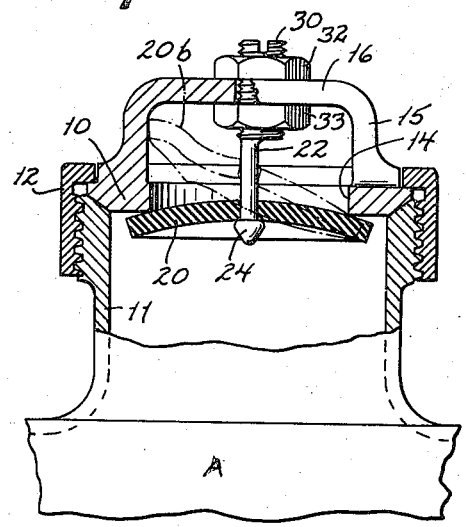
Fig. 4
INVENTOR.
HENRY C. OSBORN, JR.
BY Bates, Teare, & McBean
ATTORNEYS Patented Jan. 20, 1942

2,270,469

UNITED STATES PATENT OFFICE 2,270,469

PRESSURE RELIEF VALVE

Henry C. Osborn, Jr., Cleveland Heights, Ohio, assignor to Glascote Products, Inc., Euclid, Ohio, a corporation of Ohio Application April 10, 1941, Serial No. 387,932

9 Claims. (Cl. 137—53)

This invention relates to an improved pressure relief valve and particularly to a relief valve which will act to relieve both excess and deficient pressures and which may be adjusted to suit various pressure conditions. This, therefore, is the general object of the present invention.

Another object of this invention is to provide an improved adjustable pressure relief valve which will comprise a relatively small number of parts, easily separable, one from the other, and individually cleansed.

A further object of the present invention is to provide a pressure relief valve having a valve member to relieve pressures below or above predetermined limits, and which valve will be so constructed as to facilitate replacement of the valve member and in which the valve member may be adjusted to change the predetermined limits and thus enable the valve to be used for various pressure conditions.

Another object of the present invention is to provide an improved pressure relief valve which utilizes a flexible resilient disc as a combined valve and pressure responsive member and which is so constructed and arranged as to enable the use of the valve for various pressure limits without alteration of such combined valve and pressure responsive member.

Other objects and advantages of the present invention will become more apparent from the following description, which relates to a preferred embodiment of the invention, illustrated in the accompanying drawing and the essential features of the invention will be set forth in the claims.

Referring now to the drawing, Fig. 1 is a plan view of a pressure relief valve constructed in accord with the present invention; Fig. 2 is a vertically extending axial section as indicated by the lines 2—2 on Fig. 1; Figs. 3 and 4 are views similar to Figs. 1 and 2 respectively, but illustrating the valve as adjusted for different pressure limits.

The present invention is an improvement over that shown and claimed in my copending application, Serial No. 349,468, filed August 2, 1940. The present invention includes among its features, the provision of a pressure relief valve having a resilient valve member which also serves as the pressure responsive member of the valve and which is so arranged that the limits at which the valve acts may be adjusted to suit various pressure conditions and preferably by adjustment of a support, on which the valve member is mounted, and without requiring the removal of the valve or valve member from the container or receptacle to which it is attached, thus permitting permanent attachment of the valve to the receptacle.

Referring now to the drawings, and especially to Figs. 1 and 2, it will be seen that my improved pressure relief valve body comprises a ring 10 which may seat against the end of a vent tube or pipe 11 and be secured thereto by the union nut 12 as shown in Fig. 2, or which may be permanently secured to such vent. The ring 10 is provided with an enlarged central opening or valve port 14, and a pair of upstanding arms 15 connected at their tips by a bridge-like formation 16. To facilitate cleaning of the assembly, the ring and bridge are preferably formed as a unitary structure.

Mounted on the bridge 16, is a downwardly extending pin or valve stem 22. This valve stem extends axially through the valve port 14 and is provided with an enlarged head or valve retaining formation 23.

The valve member comprises a flexible resilient disc 20, preferably formed of a rubber composition or of a substance having generally similar physical characteristics. The valve disc 20 is slightly larger in diameter than the diameter of the valve port 14, and is provided with a substantially axially positioned opening 21, which is somewhat smaller in diameter than the diameter of the valve stem 22. The valve disc 20 is applied to the valve stem from beneath the body 10 and is shoved into position thereon until the upper surface of the valve disc 20 bears against the lower surface of the valve body or ring 10 and until the lower surface of the valve disc 20 bears against a shoulder 24 formed by the enlarged head 23 of the valve stem. The valve member is then in a dished or convex condition and the resiliency of the valve disc causes it to form the seal between the valve member and disc 10, closing the valve port 14.

When the pressure in the tank or receptacle A falls below a predetermined amount, the flexible valve member 20 is forced downward by the atmospheric pressure external of the tank, thereby opening the valve port and retaining it open as indicated by the dotted lines 20a on Fig. 2. When the pressure in the tank is increased to the predetermined minimum, the resiliency of the valve member will again close the valve port 14.

When the pressure in the tank or receptacle A increases above a predetermined maximum, it forces the valve member 20 through the valve port 14 in the disc 10, somewhat as indicated by the dotted lines 20b in Fig. 4, whereupon the pressure within the tank is brought to atmospheric pressure, and the valve disc remains in a blown or open position until reset. The frictional engagement between the periphery of the valve member and inner wall valve port opening 14 and one or both of the upstanding arms 16 of the valve assembly insures the retention of the valve member 20 or 20b in an open position.

The minimum and maximum pressure limits may be initially determined by the design of the valve disc, and particularly, by predetermining the diameter, the thickness and the resiliency of the disc as mentioned in my prior application heretofore referred to. However, I have found that it is sometimes desirable to use the same relief valve for pressure limits which differ from those initially determined. Further, I have found that sometimes the resiliency of the valve disc changes due to temperature and climatic conditions. Likewise, the resiliency changes over prolonged periods of use. These conditions may be corrected by substituting new or different valve members. However, it is preferable, to use but one size and type of valve member wherever it is practical to do so. I have found that by providing an adjustable valve stem, a great many different pressure conditions may be met by the same valve member and variations in the resiliency may be corrected. These are particular objects and features of the present invention.

As illustrated in the drawing, and particularly in Figs. 2 and 4, the stem 22, which supports the valve member, is provided with an enlarged threaded upper portion 30 which passes through an opening 31 in the bridge 16. Nuts, 32 and 33 engaging the threaded portion of the stem and positioned above and below the bridge, secure the stem in position on the bridge. By adjusting these nuts, the effective length of the stem may be changed, and thus the position of the shoulder 24 relative to the under surface of the ring 10 may be adjusted. This determines the amount of tension of the valve member against the lower surface of the ring 10 and thereby controls the minimum pressure limit. By this adjustment, changes in resiliency of the valve member may be compensated for or the minimum pressure limit may be changed to suit various requirements.

To permit adjustment of the maximum pressure limit, the reduced or lower portion of the valve stem is eccentrically carried by threaded or upper portion 30. By rotating the stem in the bridge 16 the valve disc may be moved from its maximum eccentric position relative to the valve port 14 indicated by the dotted line 20c in Fig. 1, to a concentric position relative to such port as indicated by the dotted lines 20d in Fig. 3. When the valve member is in the position shown in Figs. 1 and 2, considerable less pressure is required to force it through the valve port opening than when it is in the position shown in Figs. 3 and 4. Thus, the valve member may be positioned for various maximum pressure limits.

The threaded portion of the valve stem is preferably offset from the axis of the valve port opening. The arrangement is such that when the eccentric or lower portion of the stem is in the extreme position shown in Figs. 3 and 4, such eccentric portion will be coextensive with the axis of the valve port opening 14.

From the foregoing construction, it will be seen that my improved relief valve comprises a relatively simple construction having a combined valve and pressure responsive member, which may be readily adjusted to compensate for climatic conditions or changes in resiliency of the material of which such member is formed, or to increase or decrease the upper or lower pressure limits at which the valve is responsive, as desired.

I claim:

1. In a pressure relief valve, a valve body having a valve port opening therein, a valve stem extending toward and through the opening in the body in a direction parallel with the axis of said opening, means carried by the body to adjustably support the valve stem for rotative movement, a resilient flexible valve member eccentrically carried by said stem, and engaging one surface on the body to close the valve port opening, means on the stem to retain the valve member thereon and in contact with the body to thereby close said valve port opening, and wherein said valve member is of such size relative to said valve port as to close the valve port opening for any rotated position of said stem and at the same time to permit a portion of said member to be forced through said opening by fluid pressure to open said valve or to permit fluid pressure in the opposite direction to open said valve by moving said valve member away from said valve port opening.

2. In a pressure relief valve, a valve body having a valve port opening therein, an arm supported by said body and projecting upward and inward to a position above the valve port opening, a valve stem rotatably mounted on said arm and having an eccentric portion extending downward toward said valve port opening, a resilient flexible valve disc concentrically carried by the eccentric portion of said stem to close said opening, and means to secure said stem in any desired rotated position relative to said arm.

3. In a pressure relief valve, a valve body having a port opening therein, an arm supported by said body and projecting upward and inward to a position above the valve port opening, a valve stem mounted in the arm for rotative movement relative to the axis of said valve port opening and mounted for sliding movement axially toward and from said valve port opening, said stem having an eccentric portion extending toward said valve port opening, a resilient valve disc concentrically positioned on said stem and tensioned thereby against the undersurface of said body to close the valve port opening, and means to secure said stem in the desired rotated or axial position on said arm.

4. In a pressure relief valve, a valve body having a central opening, a U-shaped formation secured to said body in an inverted position, a valve post movably carried by said U and having an eccentric portion extending axially toward the opening in the body, a flexible resilient valve member axially secured to said eccentric portion of said valve post and in contact with the bottom surface of the body, said post being movable axially in said formation to move said valve member to various convex positions, and means to secure said post in the desired convex position.

5. In a pressure relief valve, a body having a valve port opening, a valve stem having an eccentric portion extending toward said valve port opening and movable from a position coaxial with said opening to a position eccentric to the axis of said opening, a resilient valve disc carried by said stem and engaging one surface on the body to close the opening therein.

6. In a pressure relief valve, a body having a valve port opening, a valve stem having an eccentric portion extending toward said valve port opening and movable from a position coaxial with said opening to a position eccentric to the axis of said opening, a resilient valve disc carried by said stem and engaging one surface on the body to close the opening therein, said stem also being movable axially toward and away from said valve port opening to place a predetermined tension on said disc.

7. A pressure relief valve, comprising a valve body having an enlarged circular valve port therein and an arm extending thereabove, a valve stem carried by said arm and extending toward the valve port, one end of said stem having an eccentric portion, a resilient flexible valve member axially secured to the eccentric portion of said stem, said member being of a greater diameter than the diameter of the valve port, said stem being arranged and adapted to prevent bodily movement of the valve member in a direction away from that side of the disc against which it is normally positioned and to permit bodily movement of said valve member in the opposite direction, whereby an excess pressure on said valve member may force said member through said valve port, thereby opening said port.

8. A pressure relief valve comprising, a valve body having an enlarged circular valve port therein and an arm extending thereabove, a valve stem rotatably carried by said arm and extending toward the valve port, one end of said stem having an eccentric portion, a resilient flexible valve member axially secured to the eccentric portion of said stem, said member being of a greater diameter than the diameter of the valve port, said stem being arranged and adapted to prevent bodily movement of the valve member in a direction away from that side of the disc against which it is normally positioned and to permit bodily movement of said valve member in the opposite direction, whereby an excess pressure on said valve member may force said member through said valve port, thereby opening said port, said valve stem being movable axially relative to the valve port opening to adjust the tension on said valve member, and means to secure said stem in the desired position relative to said arm.

9. In a pressure relief valve comprising a valve member having a valve port opening, a pressure responsive member to close said opening, said member being arranged and adapted to open said port consequent upon either a predetermined increased or decreased pressure condition and to reseat itself following the release of one type of pressure condition and to remain unseated following the relief of the other type of pressure condition, and means to adjustably support said valve member for movement to a position concentric or eccentric relative to said valve port opening.

HENRY C. OSBORN, Jr.